US008301780B2

(12) United States Patent  
Kuan et al.

(10) Patent No.: US 8,301,780 B2  
(45) Date of Patent: *Oct. 30, 2012

(54) CLIENT-BASED SOLUTION FOR SEAMLESS ACCESS TO APPLICATIONS ACROSS NETWORKS

(75) Inventors: David Kuan, Vienna, VA (US); Ramesh Kalathur, Fairfax, VA (US); Moshe Stoler, Gaithersburg, MD (US); Ojas T. Choksi, Herndon, VA (US); Trin D. Vu, Ashburn, VA (US); Hung Bui, Chantilly, VA (US)

(73) Assignee: Nextel Communications, Inc., Reston, VA (US)

( * ) Notice: Subject to any disclaimer, the term of this patent is extended or adjusted under 35 U.S.C. 154(b) by 1136 days.

This patent is subject to a terminal disclaimer.

(21) Appl. No.: 11/527,930

(22) Filed: Sep. 26, 2006

(65) Prior Publication Data

US 2008/0077654 A1    Mar. 27, 2008

(51) Int. Cl.  
*G06F 15/16* (2006.01)

(52) U.S. Cl. ...... 709/227; 709/220; 455/567; 455/552.1

(58) Field of Classification Search .................. 709/227, 709/220; 455/567, 552.1  
See application file for complete search history.

(56) References Cited

U.S. PATENT DOCUMENTS

| 6,215,994 | B1 | | 4/2001 | Schmidt et al. |
| 6,553,232 | B1 | * | 4/2003 | Shaffer et al. ................ 455/440 |
| 6,571,095 | B1 | * | 5/2003 | Koodli ....................... 455/435.1 |
| 6,678,533 | B1 | * | 1/2004 | Karapetkov et al. ....... 455/552.1 |
| 6,854,014 | B1 | * | 2/2005 | Amin et al. ................... 709/227 |
| 6,910,074 | B1 | * | 6/2005 | Amin et al. ................... 709/227 |
| 7,480,915 | B2 | * | 1/2009 | Costa Requena et al. .... 719/311 |
| 7,983,228 | B1 | * | 7/2011 | Choksi ......................... 370/338 |
| 8,055,262 | B1 | * | 11/2011 | Vu et al. .................... 455/435.1 |
| 2003/0154249 | A1 | * | 8/2003 | Crockett et al. ............. 709/204 |
| 2004/0184452 | A1 | * | 9/2004 | Huotari et al. ............... 370/384 |
| 2004/0196826 | A1 | | 10/2004 | Bao et al. |
| 2005/0233776 | A1 | * | 10/2005 | Allen et al. ................... 455/567 |
| 2006/0046714 | A1 | * | 3/2006 | Kalavade .................... 455/428 |
| 2006/0063547 | A1 | * | 3/2006 | Otsuki ......................... 455/517 |
| 2007/0192465 | A1 | * | 8/2007 | Modarressi .................. 709/223 |
| 2007/0217354 | A1 | * | 9/2007 | Buckley ....................... 370/328 |
| 2007/0280264 | A1 | * | 12/2007 | Milton et al. ............ 370/395.31 |
| 2008/0004006 | A1 | * | 1/2008 | Datta et al. ................. 455/432.1 |
| 2008/0070619 | A1 | * | 3/2008 | Yu ............................. 455/552.1 |
| 2008/0139186 | A1 | * | 6/2008 | Ringland et al. ............. 455/415 |
| 2009/0190550 | A1 | * | 7/2009 | Giustina et al. .............. 370/331 |
| 2009/0296642 | A1 | * | 12/2009 | Keller et al. ................. 370/329 |

OTHER PUBLICATIONS

International Search Report and Written Opinion, Mar. 14, 2008.

* cited by examiner

*Primary Examiner* — Krista Zele  
*Assistant Examiner* — James Forman

(57) ABSTRACT

A client-based solution for seamless access to applications across networks is agnostic to the inter-network mix of application architectures with or without IMS. In one embodiment, the presence of an added layer of intelligence effectively traverses and is agnostic to the various standards layers.

8 Claims, 4 Drawing Sheets

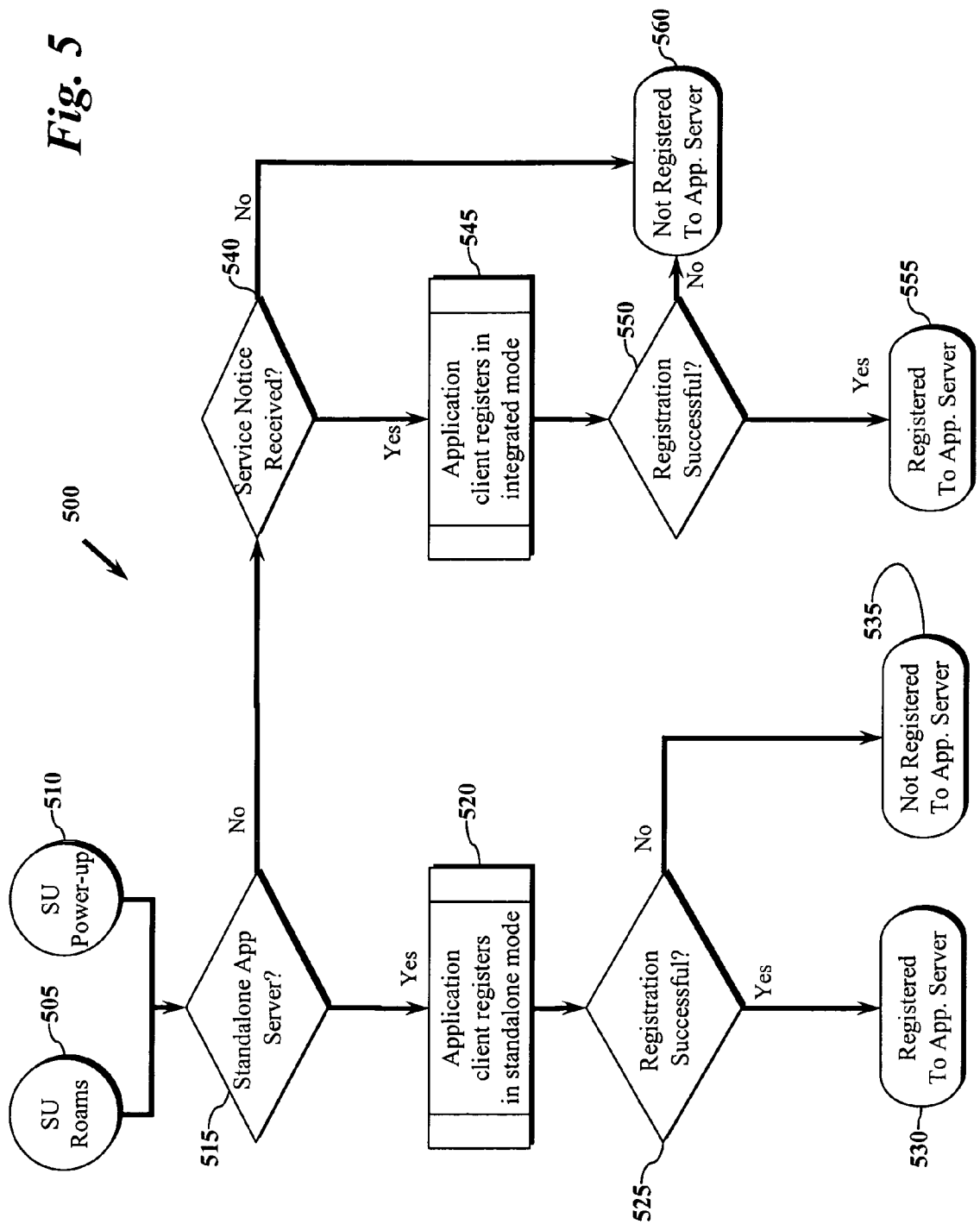

CLIENT-BASED SOLUTION FOR SEAMLESS ACCESS TO APPLICATIONS ACROSS NETWORKS

FIELD OF THE INVENTION

The present invention relates generally to wireless communications systems and more particularly to systems and methods for providing access to wireless applications across disparate networks.

BACKGROUND OF THE INVENTION

Wireless communications systems offer a variety of services to subscribers such as interconnect calling, short message service, packet data communications and push-to-talk (PTT) communications. Each wireless communications system operates using one or more wireless technologies such as code division multiple access (CDMA), global system for mobile communication (GSM), time division multiple access (TDMA) or Advanced Mobile Phone Service (AMPS).

Many wireless communications systems facilitate communications between a wireless application server and a client application resident on the wireless subscriber unit. For example, PTT services (also known as a walkie-talkie or dispatch services) are currently offered as an Internet protocol (IP) application served by a PTT server. Various frameworks exist for facilitating application services across a wireless network, including the Advanced Intelligent Network (AIN) and IP Multimedia Subsystem (IMS) standards.

However, as a mobile subscriber roams between wireless networks having different architectures, and operating under different protocols and standards, providing seamless access to a given wireless application becomes problematic. For example, many wireless communications systems implement proprietary standalone applications. Other wireless communications systems provide an IMS-based application architecture. As deployment of IMS becomes more prevalent in wireless networks, the mobility of subscriber terminals becomes problematic when there is need for carriers to provide seamless access to applications across networks due to a mix of IMS-based and stovepipe-based application architectures.

SUMMARY OF THE INVENTION

Disclosed and claimed herein is a method for registering an application client with a network application over a wireless network. In one embodiment, a method includes detecting a registration event for an application client executing on a subscriber unit, detecting availability of a standalone application platform for the network application, and initiating a standalone mode registration process for the application client in response to detecting the standalone application platform. The method further includes determining if an application availability notification has been received, and initiating an integrated mode registration process for the application client in response to receiving the application availability notification.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 5 is one embodiment of a flow diagram for implementing one or more aspects of the invention.

DETAILED DESCRIPTION OF THE EXEMPLARY EMBODIMENTS

Figure 1:
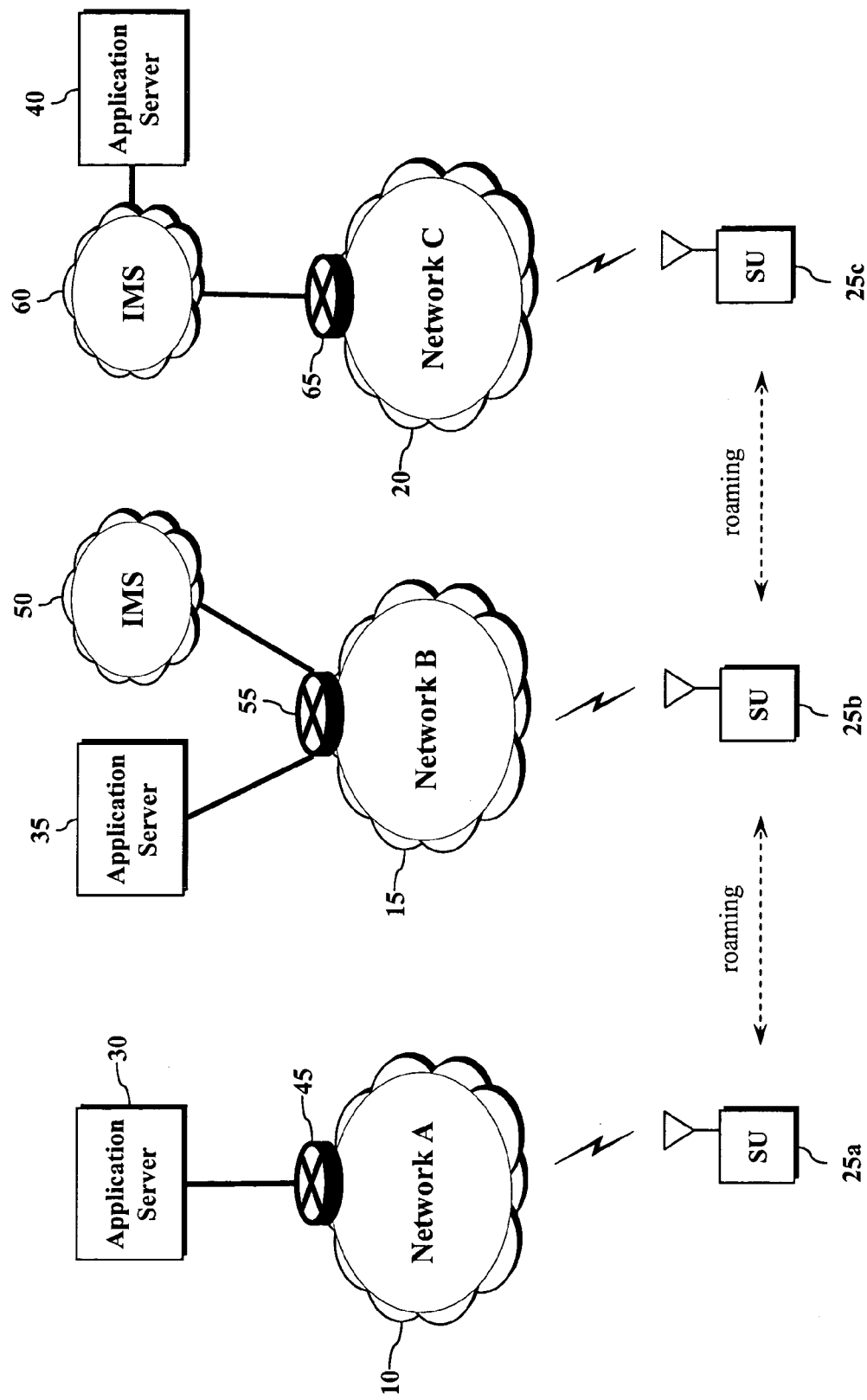
FIG. 1 is a high level block diagram illustrating three typical wireless application service architectures.

One aspect of the invention is to provide a client-based solution for seamless access to applications across networks which is agnostic to the inter-network mix of application architectures with or without IMS. In one embodiment, the presence of an added layer of intelligence in the terminal will enhance service interoperability during the transition phase to when all networks may fully integrate IMS. In another embodiment, the addition of a supervisory layer of software intelligence on the client-side may be beneficial because it creates opportunities for system maintenance, performance monitoring as well as extended functionality as the system evolves. More exactly, it creates a system entity with data links to other parts of the software system so that information can be gathered or dispersed as the system evolves. This is of special importance to telecommunications networks where standards (e.g., IMS, 3GPP) and applications are continually evolving. For example, as PTT over cellular (PoC) extends to new operators and new countries, the registration mechanism can be tuned to the subtle variations in protocol that exist from operator to operator and country to country.

Another aspect of the invention is to provide an added layer of client-side software intelligence which is effectively traverses and is agnostic to the various standards layers. This may be desirable due to the fact that successful service may require that many different standards be traversed. For example, a typical PoC application could require a special speech encoder/decoder standard at the application level, real-time transport protocol (RTP/RTSP) data control at the presentation level, session initiation protocol (SIP) at the session level, transmission control or user datagram protocol (TCP/UDP) at the transfer level, IPv4 to IPv6 at the network level, GPRS at the data link level and GSM or WCDMA at the physical level.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc.

Referring now to the figures, a communication system in which the invention may be used is described with reference to FIG. 1. As shown, a plurality of wireless networks 10, 15 and 20, respectively, provide communications services such as interconnect, short message service (SMS), packet data and push-to-talk (PTT), to a plurality of subscriber units 25a-25c (collectively, subscriber units 25) using one or more wireless technologies such as code division multiple access (CDMA), global system for mobile communication (GSM), time division multiple access (TDMA) or Advanced Mobile Phone Service (AMPS). It should be appreciated that the subscriber units 25 may be any device that is adapted to communicate with the wireless networks 10, 15 and 20, and may include such devices as cellular telephones, personal digital assistant, portable computers, etc.

Each wireless network 10, 15 and 20 includes an application server 30, 35 and 40, respectively. In one embodiment, the application servers 30, 35 and 40 include a 3G CDMA2000 1xEV-DO network providing Voice-over-IP ("VoIP") PTT services using Qualcomm's QChat technology, and the subscriber unit 25 is a QChat-enabled client device. PTT communications technology for 3G CDMA networks enables near-instant, one-to-one and one-to-many half-duplex communication. A PTT call may be formed by combining separate IP connections between each subscriber unit 25 at a PTT application server. Each application server 30, 35 and 40 may manage PTT calls originating within its respective network 10, 15 and 20, and provide PTT services to the subscriber units operating therein.

In operation, a PTT call may be originated by the subscriber unit 25 with the single press of a PTT button. Client software on the subscriber unit 25 initiates a call request through a corresponding application server (e.g., one of servers 30, 35 and 40) which establishes IP communications with each target subscriber unit. If a target user is available, the call originator can begin speaking. Communications between participating subscriber units are facilitated using voice-over Internet protocol (VoIP) technologies in which voice information is converted to digital form and transmitted over IP-based data networks in data packets.

As a given subscriber unit roams from network 10 onto network 15 (becoming subscriber unit 25b) and/or network 20 (becoming subscriber unit 25c), it may request access to a wireless application, such as a PTT service. In Network A, the application server 30 provides a standalone application to the subscriber unit 25, which may be accessed through an IP router 45. When the subscriber unit roams onto Network B, both standalone applications 35 and IMS-based application server 50 may be accessible through an IP router 55. Similarly, when the subscriber unit roams onto Network C, an application server 40 may be accessible as an IMS 60 application through an IP router 65. A person having ordinary skill in the art will appreciate that the illustrated embodiment is exemplary and that other combinations of network architectures, wireless and wireline devices may be inter-worked and other wireless technologies and components may be implemented.

Figure 2:
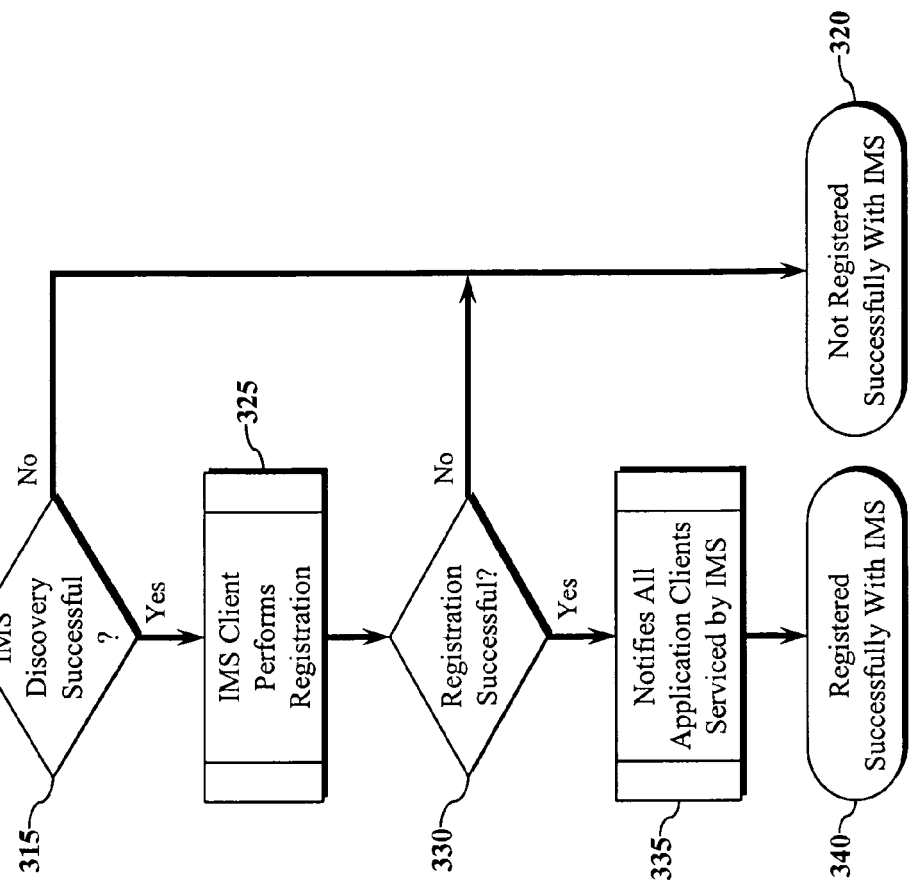
FIG. 2 is an embodiment of a typical subscriber unit.

Referring now to FIG. 2, depicted is a typical subscriber unit 25 of the prior art. As shown, subscriber unit 25 includes a control processor 70 and IMS client 75 for instructing the processor 70 to access an IMS application. Subscriber unit 25 further includes application client 80 for instructing the processor 70 to access a second type of application (e.g., non-IMS), such as a standalone application.

Figure 3:
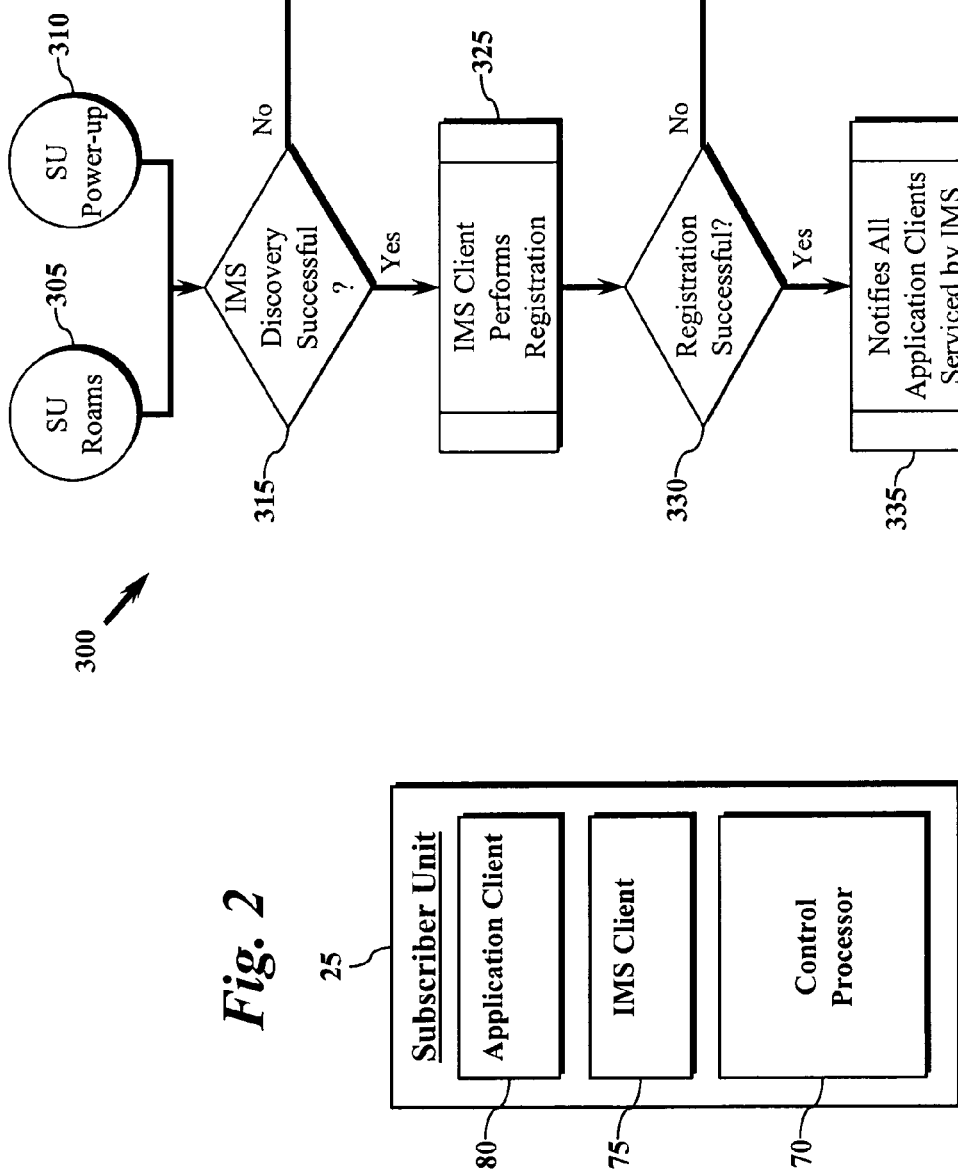
FIG. 3 is a flow diagram illustrating a typical process for IMS client registration.

As the subscriber unit roams between networks, or is otherwise powered on in a visiting network, it is typically required to re-register with the current network in order to access that network's services. To that end, the IMS client 75 implements a re-registration process 300 for an IMS-enabled subscriber unit, as illustrated in FIG. 3. The registration process 300 of FIG. 3 is executed when the subscriber unit roams onto a new network (block 305) or upon power-up of the subscriber unit (block 310). At block 315, the IMS-enabled subscriber unit attempts to discover an IMS platform (e.g., IMS server 50) in the current network (e.g., network 15) in accordance with the network's IMS discovery capabilities. If an IMS system is not found, the subscriber unit simply cannot register for IMS services and the program terminates at block 320. If, on the other hand, IMS services are discovered at block 315, then process 300 will proceed to block 325 where the IMS-enabled subscriber unit attempts to register with the newly-discovered IMS server.

Thereafter, at block 330, a determination is made as to whether the subscriber unit is unable to register. If the subscriber unit is in fact unable to register, process 300 will proceed to and terminate at block 320. If registration is successful, then at block 335 the IMS client 75 may notify all resident IMS application clients on the IMS-enabled subscriber unit, after which process 300 may terminate at block 340.

Figure 4:
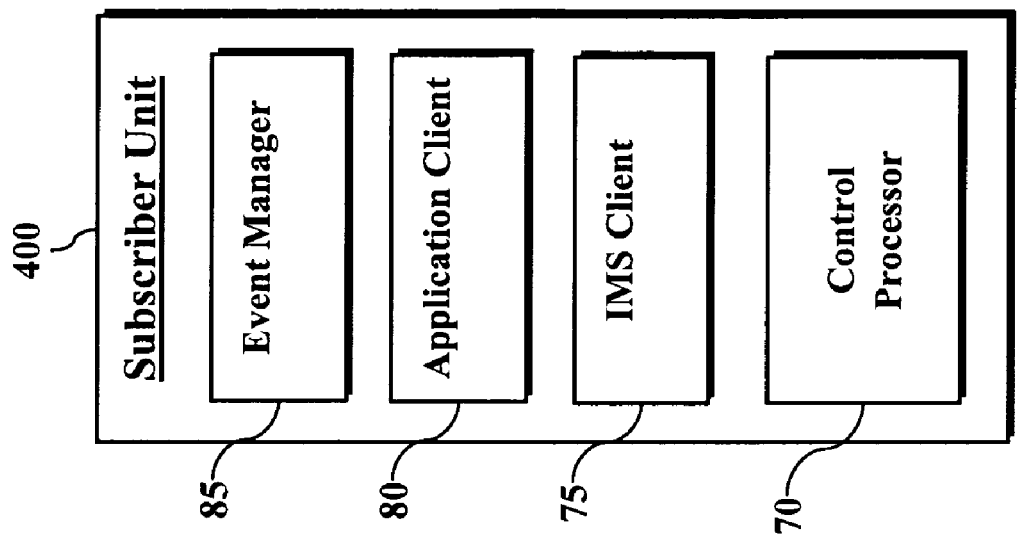
FIG. 4 is an embodiment of a subscriber unit configured in accordance with one embodiment of the invention.

Referring now to FIG. 4, depicted is one embodiment of a subscriber unit 400 in accordance with the principles of the invention. As shown, subscriber unit 25 includes a control processor 70 and IMS client 75 for instructing the processor 70 to access an IMS application. Subscriber unit 25 further includes application client 80 for instructing the processor 70 to access a second type of application (e.g., non-IMS), such as a standalone application. However, unlike a typical subscriber unit, subscriber unit 400 further includes an event manager 85 for carrying out the processes of the invention, such as the process described below with reference to FIG. 5. It should further be appreciated by one skilled in the art that IMS Client 75, Application Client 80 and/or the Event Manager 85 may be implemented in software, hardware, firmware or any combination thereof. It should further be understood that one or more of the IMS Client 75, Application Client 80 and/or Event Manager 85 may be combined into a single functioning element.

FIG. 5 is one embodiment of a process 500 carried out by the Event Manager 85 in conjunction with either or both of an IMS client (e.g., IMS Client 75) and application client (e.g., application client 80). In certain embodiments, process 500 may be carried out to provide subscriber access to an application server regardless of the presence and/or availability of IMS. While in one embodiment the application client may be a PTT client, the principles disclosed herein are equally applicable to any other types of application clients, such as location-based service (LBS) clients. As with process 300, the registration process 500 of FIG. 5 may be initiated when a subscriber unit roams onto a new network (block 505) or upon power-up of the subscriber unit (block 510). At block 515, the process 500 will attempt to discover support for a standalone application platform, such as the standalone application server 30 or 35. If a standalone application platform is detected, process 500 will continue to block 520 where the application client will register in a standalone mode.

A determination may then be made at block 525 as to whether the registration attempt of block 520 was successful or not. If so, then process 500 will continue to block 530 where the process ends with the application client being registered to the application server. If, on the other hand, the registration attempt of block 520 was not successful, then process 500 terminates at block 535 with the application client not being registered to the application server.

Alternatively, if it is determined at decision block 515 that no standalone application server is available, then process 500 continues to block 540 where a check is made to see if an application availability notification has been received either from the network itself or from the IMS client (e.g., IMS client 75), depending on how the application server is integrated with IMS. In one embodiment, this check may be made by the event manager (e.g., Event Manager 85). If such a notice is received, process 500 moves to block 545 where the application client registers in integrated mode. A determination may then be made at block 550 as to whether the registration attempt of block 545 was successful or not. If so, then process 500 will continue to block 555 where process 500 terminates with the application client being registered to the application server. If, on the other hand, the registration attempt of block 540 was not successful, then process 500 will end at block 560 with the application client not being registered with the application server. Similarly, if no notice was received at block 540, process 500 may then continue block 560 where the process 500 will end with the application client not being registered.

By way of a exemplary implementation of process 500, suppose that a network (e.g., network 10, 15 or 20) supports using a standalone PTT application platform (e.g., application server 30, 35 or 40). Further, suppose that a subscriber unit (e.g., subscriber unit 30) is equipped with a PTT client, which is one embodiment of the application client 80. In this case, upon roaming (e.g., block 505) to or powering up (e.g., block 510) within the network in question, the PTT client may query the network's domain name server (DNS) for a Regional Location Server (RLS) address (e.g., block 515). If the network has not integrated PTT with its IMS network, the PTT client will be able to resolve the RLS address successfully. The PTT client will assume that the PTT application is implemented in standalone mode and register accordingly (e.g., block 520). It should be appreciated that different mechanisms may be used, depending on the application platform, to determine if the application has been implemented in standalone mode.

If, on the other hand, the network has integrated PTT with IMS, the PTT client will not be able to successfully resolve the RLS address since RLS functionality is integrated with IMS. In this case, the PTT client would wait to receive a notification (either from the network itself or from the IMS client) indicating that the PTT application is available for the subscriber (e.g., block 540). Once such a notification is received, the PTT client will discover the PTT application is integrated with IMS and function accordingly (e.g., block 545).

For the sake of simplicity, process 500 has been defined in general steps and it should be appreciated that other steps consistent with the principles of the invention may be included. While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for registering an application client with a network application across an inter-network mix of application architectures with or without IP Multimedia Subsystem (IMS), the method comprising:
   initiating a registration process for registering the application client of a subscriber unit with the network application of a wireless network at the application client executing on the subscriber unit, the registration process including:
      determining whether a standalone application platform for the network application of the wireless network is detected or not detected, wherein the standalone application platform is an application server that is not integrated with an IMS network of the wireless network; and
      when the standalone application platform of the wireless network is detected, initiating a standalone mode registration process between the standalone application platform and the application client in response to detecting the standalone application platform; and
      when the standalone application platform of the wireless network is not detected, checking to determine if an application availability notification has been received; and
      initiating, in response to receiving the application availability notification and instead of the standalone mode registration process, an integrated mode registration process between the application client and the IMS network of the wireless network.

2. The method of claim 1, wherein the network application is a push-to-talk application.

3. The method of claim 1, wherein the determining of whether a standalone application platform for the network application of the wireless network is detected or not detected includes querying a domain name server of the wireless network for a regional location server address.

4. The method of claim 3, wherein if the regional location server address is resolved the standalone application platform is detected and if the regional location server address is not resolved the standalone application platform is not detected.

5. A wireless subscriber unit which is agnostic to an internetwork mix of application architectures with or without IP Multimedia Subsystem (IMS), the subscriber unit comprising:

memory containing an application client and instructions for registering the application client with a network application; and a processor coupled to the memory, the processor to execute the instructions and wherein the instructions include:

initiating a registration process for registering the application client of the subscriber unit with the network application of a wireless network at the application client executing on the subscriber unit, including:

determining whether a standalone application platform for the network application of the wireless network is detected or not detected, wherein the standalone application platform is an application server that is not integrated with an IMS network of the wireless network; and when the standalone application platform of the wireless network is detected, initiating a standalone mode registration process between the standalone application platform and the application client in response to detecting the standalone application platform; and when the standalone application platform of the wireless network is not detected, checking to determine if an application availability notification has been received; and initiating, in response to receiving the application availability notification and instead of the standalone mode registration process, an integrated mode registration process between the application client and the IMS network of the wireless network.

6. The subscriber unit of claim 5, wherein the network application is a push-to-talk application.

7. The subscriber unit of claim 5, wherein the determining of whether a standalone application platform for the network application of the wireless network is detected or not detected includes the processor querying a domain name server of the wireless network for a regional location server address.

8. The subscriber unit of claim 7, wherein if the regional location server address is resolved the standalone application platform is detected and if the regional location server address is not resolved the standalone application platform is not detected.

* * * * *